(12) United States Patent
Zhou et al.

(10) Patent No.: US 12,399,783 B2
(45) Date of Patent: Aug. 26, 2025

(54) PARTIAL DATABASE RESTORATION

(71) Applicant: Rubrik, Inc., Palo Alto, CA (US)

(72) Inventors: Pin Zhou, San Jose, CA (US);
Prasenjit Sarkar, Los Gatos, CA (US)

(73) Assignee: Rubrik, Inc., Palo Alto, CA (US)

( * ) Notice: Subject to any disclaimer, the term of this patent is extended or adjusted under 35 U.S.C. 154(b) by 116 days.

(21) Appl. No.: 17/849,939

(22) Filed: Jun. 27, 2022

(65) Prior Publication Data

US 2022/0327026 A1    Oct. 13, 2022

Related U.S. Application Data

(63) Continuation of application No. 16/151,263, filed on Oct. 3, 2018, now Pat. No. 11,416,344.

(60) Provisional application No. 62/567,499, filed on Oct. 3, 2017.

(51) Int. Cl.
*G06F 11/00* (2006.01)
*G06F 11/14* (2006.01)
*G06F 16/21* (2019.01)

(52) U.S. Cl.
CPC ...... *G06F 11/1451* (2013.01); *G06F 11/1461* (2013.01); *G06F 11/1469* (2013.01); *G06F 16/219* (2019.01); *G06F 2201/80* (2013.01)

(58) Field of Classification Search
CPC ............. G06F 11/1451; G06F 11/1461; G06F 11/1469; G06F 2201/80
USPC ...................................................... 714/1–57
See application file for complete search history.

(56) References Cited

U.S. PATENT DOCUMENTS

| | | | |
|---|---|---|---|
| 6,324,548 B1 | 11/2001 | Sorenson | |
| 6,701,345 B1 * | 3/2004 | Carley | G06F 16/252 709/205 |
| 7,620,785 B1 | 11/2009 | Coulter et al. | |
| 8,244,685 B2 * | 8/2012 | Fiske | G06F 11/1469 707/684 |

(Continued)

FOREIGN PATENT DOCUMENTS

| | | |
|---|---|---|
| EP | 18864993.3 | 10/2018 |
| WO | PCT/US2018/054256 | 10/2018 |
| WO | WO-2019070915 A1 | 4/2019 |

OTHER PUBLICATIONS

ISA/US, International App. No. PCT/US2018/054256, International Search Report and Written Opinion dated Dec. 4, 2018, 7 pages.

(Continued)

*Primary Examiner* — Sarai E Butler
(74) *Attorney, Agent, or Firm* — Holland & Hart LLP

(57) ABSTRACT

Described herein is a system that restores a database by processing a portion of the database. The system restores the database to a previous state at a particular time by reverting data entries that have changed since the time to their initial values before the change. Data entries that have changed after the restore time are identified. For the data entries that have changed after the restore time, their initial values before the change are determined from various sources. The system determines a database version that is created most recently before the restore time. The system additionally identifies changes to the database between the restore time and when the database version is created. The initial values can be determined from either the database version or the changes made to the database between the restore time and when the database version is created.

19 Claims, 5 Drawing Sheets

(56) References Cited

U.S. PATENT DOCUMENTS

| | | | |
|---|---|---|---|
| 8,478,726 B2 | 7/2013 | Habermann et al. | |
| 9,558,072 B1 | 1/2017 | Mam | |
| 9,563,655 B2 | 2/2017 | Chen et al. | |
| 10,049,020 B2 | 8/2018 | French et al. | |
| 10,713,124 B2 | 7/2020 | Luo et al. | |
| 11,216,344 B2 | 1/2022 | Kochar et al. | |
| 11,416,344 B2 | 8/2022 | Zhou et al. | |
| 2002/0007363 A1* | 1/2002 | Vaitzblit | G06F 11/1474 714/E11.131 |
| 2003/0061537 A1* | 3/2003 | Cha | G06F 11/2094 714/E11.13 |
| 2003/0191782 A1* | 10/2003 | Buxton | G06F 11/1471 |
| 2003/0220950 A1* | 11/2003 | Hiraoka | G06F 11/1464 |
| 2004/0181560 A1* | 9/2004 | Romanufa | G06F 16/2365 |
| 2005/0081118 A1* | 4/2005 | Cheston | G06F 11/0748 714/47.1 |
| 2005/0120064 A1 | 6/2005 | Sinha et al. | |
| 2007/0083530 A1* | 4/2007 | Lakshminath | G06F 9/466 |
| 2007/0185922 A1 | 8/2007 | Kapoor et al. | |
| 2007/0294495 A1 | 12/2007 | Uchida et al. | |
| 2008/0229142 A1* | 9/2008 | Anand | G06F 11/1438 714/6.12 |
| 2008/0270838 A1 | 10/2008 | Dorai et al. | |
| 2008/0285449 A1* | 11/2008 | Larsson | H04L 49/254 370/232 |
| 2009/0228429 A1* | 9/2009 | Diaconu | G06F 16/1865 |
| 2009/0323970 A1* | 12/2009 | Cerruti | G06F 21/602 380/281 |
| 2010/0017573 A1 | 1/2010 | Shinozaki et al. | |
| 2011/0087874 A1* | 4/2011 | Timashev | G06F 11/1469 714/E11.02 |
| 2011/0161295 A1 | 6/2011 | Ngo | |
| 2011/0161327 A1* | 6/2011 | Pawar | G06F 16/907 707/812 |
| 2011/0258164 A1 | 10/2011 | Mandagere et al. | |
| 2012/0110287 A1 | 5/2012 | Han et al. | |
| 2013/0111266 A1* | 5/2013 | Tosaka | G06F 11/366 714/28 |
| 2014/0108367 A1* | 4/2014 | Kim | G06F 16/2379 707/703 |
| 2014/0115232 A1 | 4/2014 | Goss et al. | |
| 2014/0250085 A1* | 9/2014 | Sorenson | G06F 16/2322 707/684 |
| 2015/0112591 A1* | 4/2015 | Kim | G01C 21/32 701/532 |
| 2015/0261623 A1 | 9/2015 | Ho et al. | |
| 2015/0370644 A1* | 12/2015 | Graefe | G06F 11/1466 707/685 |
| 2016/0110268 A1 | 4/2016 | Sekiguchi et al. | |
| 2016/0117228 A1 | 4/2016 | Farlee et al. | |
| 2016/0306709 A1* | 10/2016 | Shaull | G06F 11/1458 |
| 2017/0075764 A1 | 3/2017 | Banister | |
| 2017/0212902 A1* | 7/2017 | Graefe | G06F 16/113 |
| 2017/0230177 A1 | 8/2017 | Barbas et al. | |
| 2018/0032411 A1* | 2/2018 | Thakur | G06F 11/1469 |
| 2018/0137016 A1 | 5/2018 | Brown et al. | |
| 2018/0373604 A1 | 12/2018 | Martin et al. | |
| 2019/0073372 A1 | 3/2019 | Venkatesan et al. | |
| 2019/0102257 A1 | 4/2019 | Zhou et al. | |
| 2019/0155699 A1 | 5/2019 | Luo et al. | |
| 2021/0117293 A1 | 4/2021 | Luo et al. | |
| 2021/0224166 A1 | 7/2021 | Luo et al. | |
| 2021/0357297 A1 | 11/2021 | Kochar et al. | |
| 2022/0058093 A1 | 2/2022 | Kochar et al. | |
| 2022/0114064 A1* | 4/2022 | Gupta | G06F 16/219 |

OTHER PUBLICATIONS

EP Application No. 18864993.3, Extended European Search Report dated Oct. 23, 2020, 8 pages.

Osuna, et al. "Introduction to SnapManager for Virtual infrastructure," SnapManager 2.0 for Virtual Infrastructure Best Practices, IBM Corp., 2010, 6 pages.

Rubrik, "Rubrik Announces Andes 5.0 Release, Enabling Global Enterprises to Protect, Automate, and Govern Mission-Critical Applications and Data Across Hybrid Clouds", www.rubrik.com, 2020, 7 pages.

Rubrik, "Rubrik Andes 5.0: Protect, Automate, and Govern Mission-critical Applications Across Hybrid Cloud", www.rubrik.com, Nov. 12, 2018, 2 pages.

Rubrik, "Game-Changing Innovation for Oracle Data Management," www.rubrik.com, Nov. 12, 2018, 4 pages.

U.S. Appl. No. 62/567,499, filed Oct. 3, 2017.

U.S. Appl. No. 16/151,263, filed Oct. 3, 2018, now U.S. Pat. No. 11,416,344 B.

U.S. Appl. No. 15/819,373, filed Nov. 21, 2017, now U.S. Pat. No. 10,713,124 B2.

U.S. Appl. No. 16/890,542, filed Jun. 2, 2020.

U.S. Appl. No. 17/143,081, filed Jan. 6, 2021.

U.S. Appl. No. 15/931,291, filed May 13, 2020, now U.S. Pat. No. 11,216,344 B2.

U.S. Appl. No. 17/517,895, filed Nov. 3, 2021.

\* cited by examiner

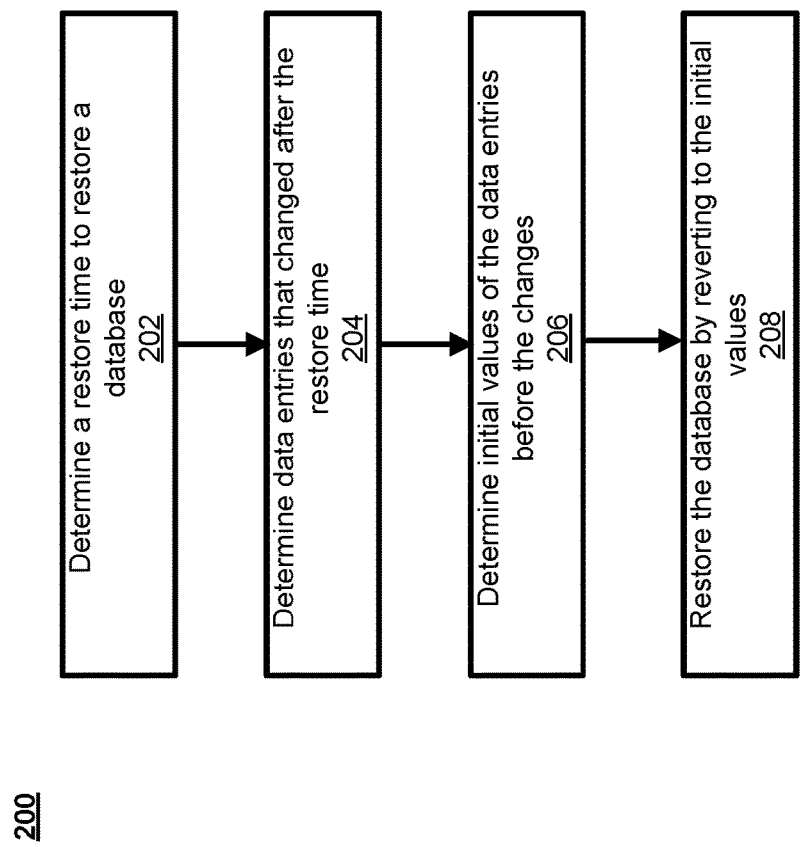

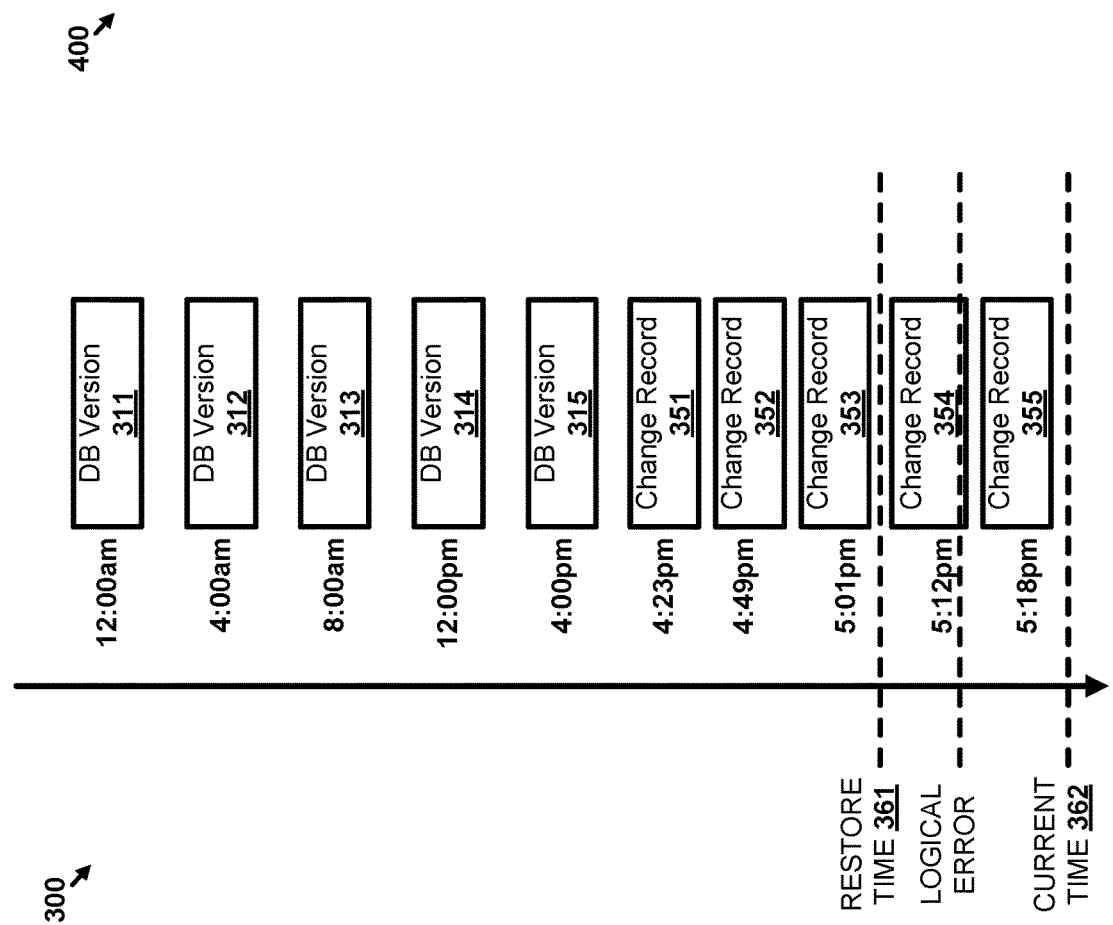

PARTIAL DATABASE RESTORATION

CROSS-REFERENCE TO RELATED APPLICATIONS

This application is a continuation of U.S. application Ser. No. 16/151,263 by Zhou et al., entitled "Partial Database Restoration", filed Oct. 3, 2018; which claims the priority benefit of U.S. Provisional Application 62/567,499 by Zhou et al., entitled "Efficient Database Restoration to a Previous State Using Change Information", filed Oct. 3, 2017, of which the subject matter is incorporated herein by reference in its entirety.

TECHNICAL BACKGROUND

Database backups can be created periodically to protect the information stored in the databases. In the event that a database crashes, corrupts, or is lost, the backups can be used to restore the database to an earlier state. For instance, if a database crashes at 4:55 pm, the database can be restored by loading the last backup created at 4 pm. This approach does not restore the database to its latest state before the error. Continue with the previous example, the changes between 4 pm and 4:55 pm are lost. Furthermore, the restoration process is a computing-resource intensive task. Transfer of backups typically consumes a lot of network bandwidth because backups include a large amount of data. In addition, loading a backup into a database consumes a lot of processing resources. During the recovery, the database may not even be accessible, which may lead to reduced productivity for functions that rely on such accesses.

SUMMARY

Described herein is a system that restores a database by processing a portion of the database. The system restores the database to a previous state at a particular time by reverting data entries that have changed since the time to their initial values before the change. As such, the restoration can be achieved by processing the database partially which obviates the need to process the entire database. Compared to conventional ways of restoring databases by loading an entire database backup, the approach described herein is more efficient, and consumes less network bandwidth and computing power. This is because the system does not process those data entries that have not changed since the time.

The system determines a restore time at which the database is to be restored to a previous state determined by the restore time. The restore time can be set to a time point right before when the database crashes, corrupts, or gets lost. These events may be caused by logical errors. Data entries that have changed after the restore time are identified. For the data entries that have changed after the restore time, their initial values before the change are determined from various sources. The system determines a database version that is created most recently before the restore time. The system additionally identifies changes to the database between the restore time and when the database version is created. The initial values can be determined from either the database version or the changes made to the database between the restore time and when the database version is created. The database is restored to the previous state by reverting those data entries to their initial values.

BRIEF DESCRIPTION OF THE DRAWINGS

The invention has other advantages and features, which will be more readily apparent from the following detailed description of the invention and the appended claims, when taken in conjunction with the accompanying drawings, in which:

FIG. 2 is a flow chart illustrating an example process of restoring a database by processing a portion of the database, according to one embodiment.

FIG. 3 illustrates a timeline of events in the environment, according to one embodiment.

FIG. 4 is a flow chart illustrating an example process of an environment restoring a database to a previous state by processing a portion of the database, according to one embodiment.

DETAILED DESCRIPTION

Described herein is a system that restores a database to its previous state by processing a portion of the database, which reduces the amount of time and resources used to restore the database. To do so, the system leverages a database system's ability to track changes in a database. The changes are used to determine which data entries have changed during a time interval. To restore a database back to its previous state at a particular time, only the data entries that changed are rolled back to their previous values, as described in more detail below. This process is much more time and computing resource efficient because the number of changed entries is far fewer than the number of all entries.

Figure 1:
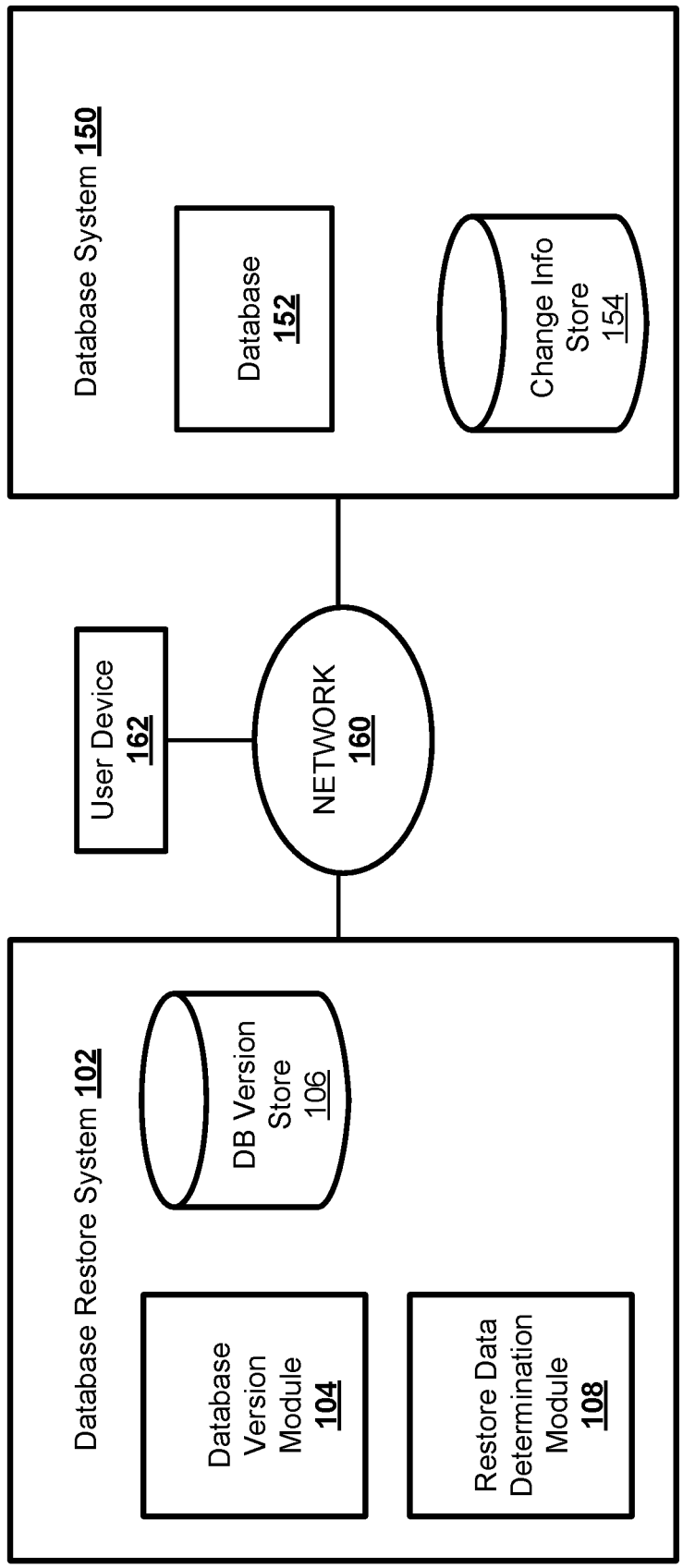
FIG. 1 is a diagram of an example environment in which a database restore system restores a database by processing a portion of the database, according to one embodiment.

FIG. 1 is a diagram of an example environment 100 in which a database restore system restores a database by processing a portion of the database, according to one embodiment. The example environment 100 includes a database restore system 102 and a database system 150. As further described below, the database system 150 hosts databases and the database restore system 102 manages restoration of the databases hosted by the database system 150. The database restore system 120 and the database system 150 are in communication with each other via a network 160. The environment 100 further includes a user device 162 that is in communication with the rest of the environment 100 via the network 160.

The database restore system 102 manages restoration of databases such as those hosted by the database system 150. For a particular database that is to be restored to a previous state, the database restore system 102 determines a portion of the database that has changed from the previous state and reverts the portion back to its previous state. The database restore system 102 includes a database version module 104, a database version store 106, and a restore data determination module 108.

The database version module 104 creates and maintains database versions of databases (e.g., the database 152). A database version captures a state of a database at a particular time. That is, the database version includes a copy of data stored in the database at the particular time point. The data stored in the database includes data entries and associated values. A database version can be a full copy or an incremental copy of the data stored in the database at the particular time point. The full copy includes copies of all data stored in the database at the time point. The incremental copy includes copies of data that has changed since the immediate previous database version was created. The database versions are stored in the database version store 106. For a particular database, the database versions effectively serve as backups of the database. For example, a previous state of the database can be restored by using a full copy of the database. As another example, a previous state of the database can be restored by using an incremental copy and the full copy of the database referenced by the incremental copy.

The restore data determination module 108 determines the portion of the database that has changed and a previous state to which this portion is to be restored. To determine the portion of the database that has changed, the restore data determination module 108 determines which entries have changed from the previous state. The previous state can be determined by a time. This time is also referred hereinafter as the "restore time." The database is restored from a later state to the previous state. This later state is a state of the database at a later time after the restore time. In some embodiments, this later state is the current state of the database at the current time.

In some embodiments, the restore data determination module 108 determines the data entries that changed from the restore time to the later time based on change information. The change information describes changes made to the database in a time window. The changes made to the data entries include adding a data entry, deleting a data entry, modifying a data entry, or other changes. In some embodiments, the change information describes a particular data entry that changed and the value of the data entry after the change. The change information also includes a timestamp associated with each change. The restore data determination module 108 uses the restore time and the later time to find the data entries that changed from the previous state to the later state. The data entries that changed during the time interval from the restore time through the later time are associated with timestamps within the time interval. If the later time is the current time, the restore data determination module 108 uses the restore time to find the data entries that have changed from the previous state, for example, by comparing the timestamps associated with the changes to the restore time. Data entries that changed before the later time can be found in a similar fashion. The change information is created by the database system 150 as further described below.

The restore data determination module 108 obtains the change information from the database system 150. In some embodiments, if a database is to be restored, the restore data determination module 108 obtains the change information from the database system 150. In some embodiments, the restore data determination module 108 obtains the change information periodically from the database system 150. The restore data determination module 108 may obtain the change information describing changes in a particular time interval. In some embodiments, the restore data determination module 108 receives change information from the database system 150 if a change is made to the database. The provision of information can be configured in either a push or pull arrangement between the restore data determination module 108 and database system 150.

The restore data determination module 108 determines the previous state to which the portion is to be restored by determining initial values of the data entries that changed from the previous state. That is, for each data entry that changed from the restore time, the restore data determination module 108 determines a value of the data entry before the change. This value is also referred to herein as the "previous value" or "initial value." The restore data determination module 108 determines one or more data sources from where the previous values can be obtained. A data source can be a database version or change information.

The restore data determination module 108 identifies a database version as one data source based on the restore time. For a particular database, the database version is the latest database version that is created most recently before the restore time among all database versions created. This database version is also referred to herein as "a restore database version." The restore database version is not necessarily the latest database version that is created by the database version module 104 for the database. The restore database version can be identified from database versions stored in the database version store 106. For example, the restore data determination module 108 compares the restore time to time stamps associated with the database versions stored in the database version store 106 to find the restore database version.

The restore data determination module 108 further identifies any portion of the database that changed from the restore database version creation time to the restore time. For example, any data entry that changed from the restore database version creation time to the restore time is identified. The restore data determination module 108 may identify such data entry by determining change information that describes changes made to the database from the restore database version creation time to the restore time. The determination is similar to the determination of data entries that changed from the restore time to the later time as described above.

For a data entry that changed from the restore time, the restore data determination module 108 determines its previous value from one of the one or more identified data sources. The restore data determination module 108 examines the one or more identified data sources in a reverse chronological order. That is, for a particular data entry, the restore data determination module 108 determines whether the data entry matches any data entry that changed from the restore database version creation time to the restore time. If there is a match, the restore data determination module 108 determines that the value included in the change information is the previous value. If there are multiple matches, the restore data determination module 108 determines that the value in the latest change information is the previous value. If there is no match, the restore data determination module 108 determines that the value of the data entry in the restore database version is the previous value. In some embodiments, when examining whether the data entry matches any data entry in the change information, the restore data determination module 108 stops examining the entire change information after identifying a match.

The restore data determination module 108 provides the previous values of the data entries that changed from the restore time to the database system 150. To restore the database to the previous state, the database system 150 reverts those data entries to their previous values. That process effectively restores database 152 to the previous state without having to restore the entire database.

The database system 150 includes a database 152 and a change information store 154. The database system 150 hosts the database 152. In operation, the database system 150 hosts information in the form of data entries within the database 152. The database 152 can be hosted by a single device or a distributed database that is hosted by multiple devices. The database system 150 may include one or multiple devices across which the database 152 is hosted. Users and applications may communicate with the database system 150 to access the database 152.

The database system 150 tracks changes made to the database 152. In some embodiments, the database system 150 tracks changes since the creation time of the most recent database version. In some embodiments, the database system 150 tracks changes over time. That is, changes made to the database between database versions are tracked. In various embodiments, the change information is in the form of a change log including change records. A change record is generated to record one change such as a database operation (e.g., insert, delete, update) made to one data entry at a particular time. The change information is stored in the change information store 154.

The user device 162 is a computing device with which users interact. Via the user device 162, a user can access the database system 150 and the database restore system 102. For example, a user can provide the restore time or a logical error via the user device 162. A logical error may impact one or more database entries, for example, by changing the entries to wrong values.

The network 160 facilitates the data information exchange among different components in the environment 100. The network 160 includes network elements such as switches, routers, wireless/wired communication links, etc. Many different types of networks could be used. In some cases, the network 160 uses standard communications technologies and/or protocols and can include the Internet, local area networks, and other types of private or public networks. The components can also be connected using custom and/or dedicated data communications technologies.

FIG. 2 is a flow chart of an example process 200 of restoring a database by processing a portion of the database, according to one embodiment. Take the environment 100 illustrated in FIG. 1 as an example, the database restore system 102 determines 202 a restore time to restore the database 152. The restore time may be determined in a variety of ways. The database restore system 102 may determine the restore time, for example, according to a timestamp associated with a data entry (e.g., when the data entry was created or modified). As one example, a user identifies a corrupt data entry and the database restore system 102 determines the restore time as the time right before the corruption event. The system may also receive the restore time from another system such as the database system 150 or a user device 162. A restore time may be included in a user instruction.

The database restore system 102 determines 204 data entries that changed after the restore time. Based on the restore time, the database restore system 102 obtains change information that describes changes made to the database after the restore time. For example, the database restore system 102 obtains changes information from the change information store 154 by comparing the restore time to timestamps associated with the changes. As such, the database restore system 102 determines changes made to the database 152 after the restore time. If the database 152 is restored from a later time that is not the current time, the changes are made before the later time. Details of the determination are provided above in connection with the restore data determination module 108.

The database restore system 102 determines 206 initial values of the data entries before the changes. For example, the database restore system 102 determines one or more data sources that include the initial values of the data entries before the changes. A data source can be a restore database version or change information including changes made to the database from the restore database version creation time to the restore time. For each data entry that changed after the restore time, the database restore system 120 determines whether it changed from the restore database version creation time to the restore time. If it did, its initial value is the value included in latest change within the time interval between the restore database version creation time and the restore time. If it did not, its initial value is the value stored in the restore database version. Details of the determination of the initial values are described above in connection with the restore data determination module 108.

The database restore system 102 restores 208 the database to a previous state by reverting the data entries to their initial values. The previous state is the state of the database 152 at the restore time. The database restore system 102 may provide a list of the data entries and their initial values to the database system 150. For each data entries on the list, the database system 150 reverts its value to the initial value. For example, if a data entry is modified after the restore time, the database system 150 reverts its value to the initial value before the restore time. If a data entry is removed after the restore time, the database system 150 inserts it along with its initial value before the removal. If a data entry is added after the restore time, the database system 150 removes it.

FIGS. 3 and 4 are described in connection with each other. FIG. 3 illustrates a timeline 300 of events in the environment 100. FIG. 4 is a flow chart 400 illustrating an example process of the environment 100 restoring a database (e.g., the database 152) to a previous state by processing a portion of the database.

The database restore system 102 periodically creates 401 database versions of the database 152. As illustrated in FIG. 4, the database restore system 102 creates database versions every four hours: the database versions 311-315 are created at 12:00 am, 4:00 am, 8:00 am, 12:00 pm, and 4:00 pm, respectively. The database versions can be used to restore the database 152 to a state corresponding to a time point that is between 12:00 am (when the database version 311 was created) and 4:00 pm (when the database version 315 was created). The database restore system 102 may create other database versions over time. Assuming that the database version 311 is the first version created by the database restore system 102, the database version 311 is a full copy of the database 152. The database versions 312 through 315 are incremental copies of the database 152. It should be understood that, while the period between database versions is four hours in this example, other period lengths may be used.

The database system 150 further tracks changes made to the database. The database system 150 creates and stores change information describing the changes made to the database over time. In some embodiments, the change information is stored in a change log including change records. In the illustrated example, after 4:00 pm when the most recent database version 315 was created, the database system 150 creates change records 351 through 355 that describe changes made to the database after 4:00 pm. The change records 351 through 355 each record a data entry change made to a data entry at 4:23 pm, 4:49 pm, 5:01 pm, 5:12 pm, and 5:18 pm, respectively. Each change record includes information such as a data entry identifier identifying the data entry that changes as well as the value of the data entry after the change. The changes made to the database from 12:00 am to 4:00 pm are not shown in FIG. 3.

The current time 362 is some time after 5:18 pm data entry change which is recorded in the change record 355. The database 152 is to be restored to a state corresponding to the restore time 361. The restore time 361 is after 5:01 pm data entry change which is recorded in the change record 353 and before 5:12 pm data entry change which is recorded in the change record 354. Details of the obtaining information are provided above and are omitted herein.

The database restore system 102 detects 403 a logical error in the database 152. The logical error began with the 5:12 pm data entry change which is recorded by the change record 354. The database restore system 102 may receive a report of the logical error from the database system 150. In some embodiments, the logical error may be detected according to a user input. For example, a user identifies a set of change records that are caused by the logical error and provides the identification to the database restore system 102.

The database restore system 102 determines 404 a restore time. The restore time may be determined according to a user input based on the time of the logical error. For example, a user identifies database entries that are affected by a logical error and determines the restore time as a time prior to the logical error. The user may identify a series of change records recording the data entry changes caused by the logical error and determines the restore time as the time point before the earliest change record caused by the logical error. The user provides the restore time to the database restore system 102. In the illustrated example, the 5:12 pm data entry change is caused by the logical error and the restore time 361 is set to a time right before the 5:12 pm data entry change thereby to restore the database to a state before the logical error. The user input may be received from the workstation 303.

The database restore system 102 identifies 405 data entries that changed after the restore time. For example, the database restore system 102 determines change records associated with time stamps after the restore time. The data entries are identified by data entry identifiers included in the change records. These entries are potentially affected by the logical error. Accordingly, these entries are reverted to their initial values before the logical error. In the illustrated example, the database restore system 102 determines that change records 354 and 355 are associated with timestamps after the restore time 361, and the corresponding data entries changed after the restore time.

The database restore system 102 determines 406 one or more data sources based on the restore time. The one or more data sources include the initial values of the entries that changed after the restore time. A data source can be a data entry change or a database version. The one or more data sources include the restore database version and any change to the database from the restore database version creation time to the restore time. Based on the restore time, the database restore system 102 identifies the database version that is the latest database version created before the restore time as the restore database version. The database restore system 102 identifies a set of change records associated with time stamps that are between the restore database version creation time and the restore time. For example, the database restore system 102 determines that the database version 315 and the 4:23 pm, 4:49 pm, 5:01 pm data entry changes are the data sources from where the initial values of the data entries can be found.

The database restore system 102 determines 407 the initial values of the data entries from the one or more data sources. For a data entry that changed after the restore time, the database restore system 102 determines a data source that includes the initial value and retrieves the initial value from the data source. For example, for a data entry that changed after the restore time, the database restore system 102 looks up its data entry identifier (ID) in the one or more data sources. If there is a match, the database restore system 102 determines that the matching change record with the latest time stamp stores the initial value. If there is no match, the database restore system 102 concludes that the data entry is added after the restore time and does not exist before the restore time. In some embodiments, the database restore system 102 looks up an entry in the change records in a reverse chronological order. If there is a match, the database restore system 102 terminates checking the rest of the data sources. In some embodiments, to retrieve a data entry's value, the database restore system 102 creates a database index to represent the database and looks up a data entry ID in the database index. The database index is a data structure.

The database system 150 reverts 408 the data entries back to their initial values. The database system 150 receives the initial values from the database restore system 102 and updates the database with the initial values. For a data entry that is identified to have changed since the restore time, the database system 150 replaces its current value with the initial value. For example, if a data entry is removed after the restore time, the database system 150 restores the data entry with the initial value in the database. If a data entry is added after the restore time, the database system 150 removes the data entry in the database. If a data entry is modified, the database system 150 restores the data entry with the initial value in the database.

Figure 5:
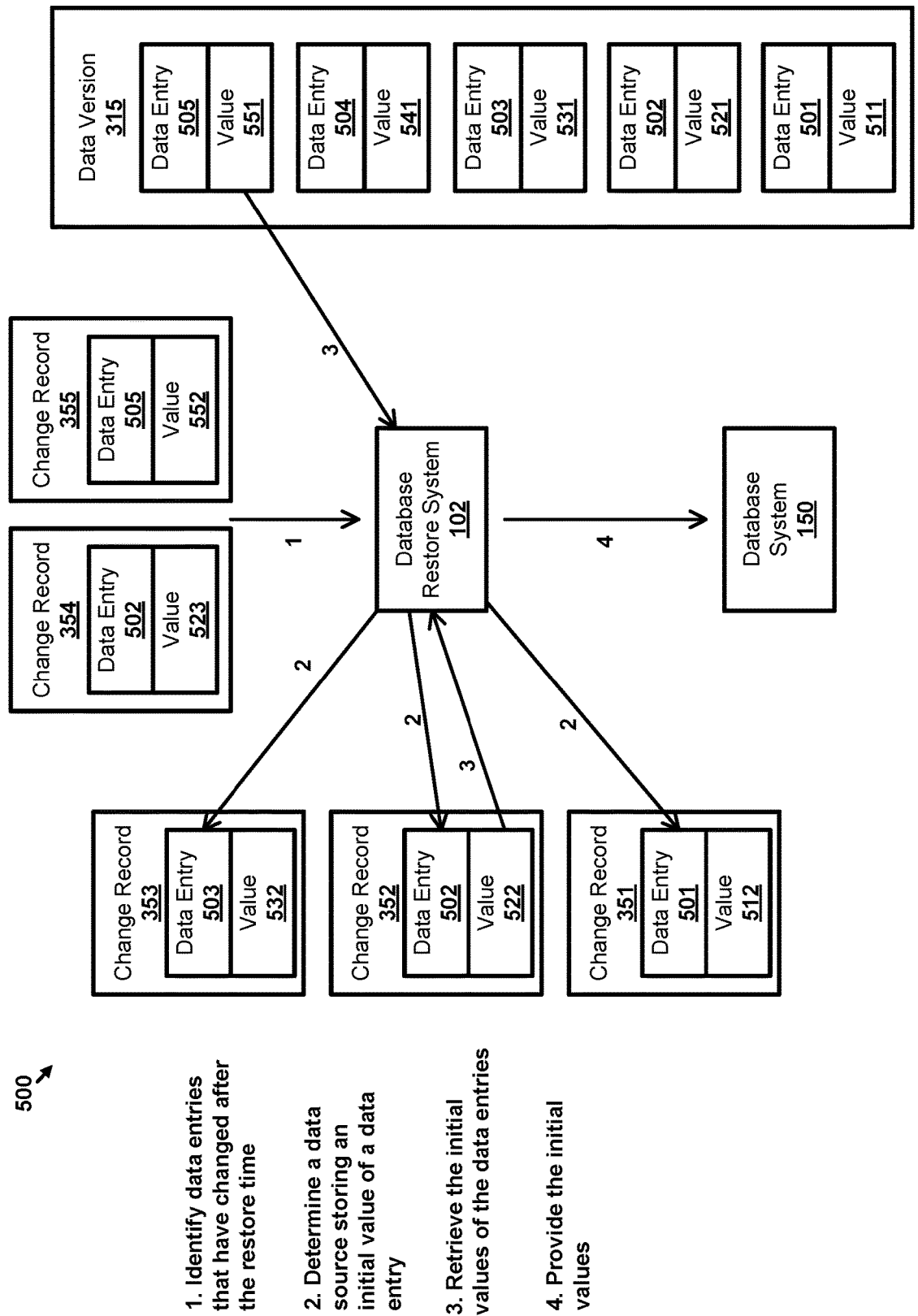
FIG. 5 illustrates an example of an environment determining data entries' initial values, according to one embodiment.

FIG. 5 illustrates an example 500 the environment 100 determining data entries' initial values. At step 1, the database restore system 102 determines that data entries 502, 505 changed after the restore time 361.

At step 2, for each data entry, the database restore system 102 determines a data source that stores the data entry's initial value. The database restore system 102 looks up the data entry 502 (or 505) in a reverse chronological order: from the latest data source (i.e., the change record 355) to the earliest data source (i.e., the restore database version 315). Take the data entry 502 for example. The database restore system 102 compares the data entry 502 to the data entry 503 in the change record 355 and does not find a match. After that, the database restore system 102 compares the data entry 502 to the data entry 502 in the change record 352 and finds a match. Because there is a match, the database restore system 102 stops looking up the data entry 502 in the change record 351 or in the database version 315. The database restore system 102 determines that the value 522 stored in the change record 352 is the initial value of the data entry 502 before the restore time 361. Take the data entry 505 for example. The database restore system 102 looks up the data entry 505 in the change records 351 through 353, and does not find a match. The database restore system 102 looks up the data entry 505 in the database version 315 and finds a match. The database restore system 102 determines that the value 551 stored in the database version 315 is the initial value of the data entry 505.

At step 3, for the data entry 502, the database restore system 102 retrieves the value 522 from the change record 352. For the data entry 505, the database restore system 102 retrieves the value 551 from the database version 315. The values 522 and 551 are used to restore the data entries 502 and 505, respectively.

In one example, the database restore system 102 creates an index indexing data entries in the database version 315 when creating the database version 315. The database restore system 102 can look up a data entry in the index rather than in the database version. The index of the database version 315 is incorporated into an overall index including indexes of previously created database versions 311-314. The database restore system 102 uses this index to search for the data entry 505. Additional discussion regarding this index search method for retrieving data entry values may be found in U.S. patent application Ser. No. 15/409,777, which is hereby incorporated by reference in its entirety. Other manners of obtaining the value 551 may also be used.

At step 4, the database restore system 102 provides the initial values to the database system 150. The database system 150 restores the data entries 502, 505 to initial values 532, 551, respectively.

Figure 6:
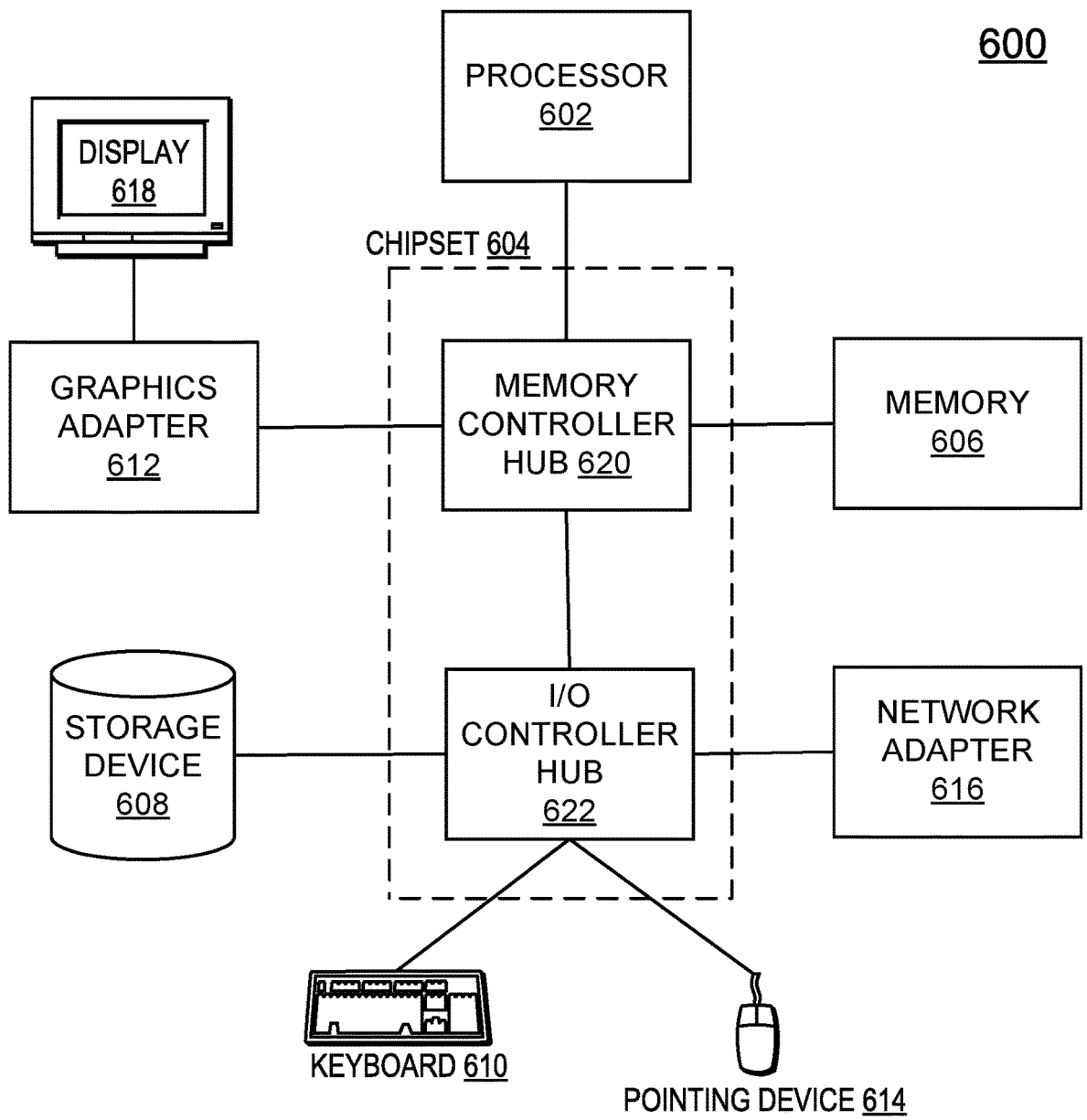
FIG. 6 is a high-level block diagram illustrating an example computing system.

Turning now to a discussion of the implementation of the database restore system 102, FIG. 6 is a high-level block diagram illustrating an example computing system 600 for implementing the entities shown in FIG. 1. The computing system 600 includes at least one processor 602 coupled with a chipset 604 and the memory 606. The chipset 604 includes a memory controller hub 620 and an input/output (I/O) controller hub 622. A memory 606 and a graphics adapter 612 are coupled with the memory controller hub 620, and a display 618 is coupled to the graphics adapter 612. A storage device 608, an input device 614, and network adapter 616 are coupled to the I/O controller hub 622. Other embodiments of the computing system 600 have different architectures.

The storage device 608 is a non-transitory computer-readable storage medium such as a hard drive, compact disk read-only memory (CD-ROM), digital video disk (DVD), or a solid-state memory device. The memory 606 holds instructions and data used by the processor 602. The input device 614 is a touch-screen interface, a mouse, track ball, or other type of pointing device, a keyboard 610, or some combination thereof, and is used to input data into the computing system 600. In some embodiments, the computing system 600 may be configured to receive input (e.g., commands) from the input device 614 via gestures from the user. The graphics adapter 612 displays images and other information on the display 618. The network adapter 616 couples the computing system 600 to one or more computer networks.

The computing system 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602 to cause the computing system 600 to perform the functions described herein.

The types of computing system 600 used by the entities of FIG. 1 can vary depending upon the embodiment and the processing power required by the entity. For example, the database restore system 102 can run in a single computing system 600 or multiple computing systems communicating with each other through a network such as in a server farm. The computing system 600 can omit some of the components described above, such as the graphics adapter 612 or the displays 618.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions that are executable by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method, comprising:
    detecting an error in a database supported by a database restore system;
    determining a restore time for the database based at least in part on detecting the error, the restore time occurring prior to the error;
    querying a change log stored at the database restore system to identify one or more data entries in the database that were modified after the restore time, the change log comprising one or more change records corresponding to the one or more data entries, the one or more data entries comprising a subset of total data entries in the database;
    determining that a data entry associated with a data entry identifier was added to the database after the restore time based at least in part on the one or more change records not comprising the data entry identifier;

determining respective previous values of the one or more data entries from a previous copy of the database stored at the database restore system, the previous copy being based at least in part on a full backup copy of the database and corresponding to a time period prior to the restore time; and performing a partial restoration of the database by reverting the one or more data entries to the respective previous values of the one or more data entries, wherein performing the partial restoration of the database comprises removing the data entry from the database.

2. The method of claim 1, further comprising:
identifying one or more partial changes made to the database after the restore time, wherein determining the respective previous values of the one or more data entries is based at least in part on identifying the one or more partial changes.

3. The method of claim 1, further comprising:
receiving, via a user interface, a user input that indicates a time at which the error occurred within the database, wherein detecting the error is based at least in part on the user input.

4. The method of claim 1, further comprising:
receiving, via a user interface, a user input that indicates a second data entry affected by the error, wherein determining the respective previous values of the one or more data entries comprises determining a value of the second data entry prior to the error, wherein the previous copy corresponds to a time prior to the error.

5. The method of claim 1, further comprising:
determining that a second data entry was removed from the database after the restore time, wherein restoring the database comprises adding the second data entry to the database.

6. The method of claim 1, further comprising:
retrieving an identifier of a second data entry that was modified after the restore time,
wherein querying the change log comprises querying the one or more change records in reverse chronological order using the identifier of the second data entry.

7. The method of claim 1, wherein the one or more change records indicate previous values for the one or more data entries, updated values for the one or more data entries, identifiers of the one or more data entries, and times at which the one or more data entries were modified.

8. The method of claim 1, wherein determining the respective previous values of the one or more data entries comprises:
retrieving previous values for the one or more data entries from a plurality of data sources comprising the previous copy of the database within the database restore system.

9. The method of claim 1, wherein determining the respective previous values of the one or more data entries comprises:
identifying previous values of the one or more data entries by querying one or more indices corresponding to the previous copy of the database.

10. The method of claim 1, wherein the restore time for the database is selected by a user of the database restore system.

11. The method of claim 1, wherein the previous copy of the database comprises a latest version of the database prior to the restore time.

12. The method of claim 11, further comprising:
selecting the latest version of the database from two or more versions of the database stored at the database restore system based at least in part on creation times associated with the two or more versions.

13. The method of claim 1, wherein performing the partial restoration comprises:
refraining from processing a remainder of data entries in the database other than the one or more data entries.

14. An apparatus, comprising:
a processor; and
memory coupled with the processor, the memory comprising instructions that are executable by the processor to cause the apparatus to:
detect an error in a database supported by a database restore system;
determine a restore time for the database based at least in part on detection of the error, the restore time occurring prior to the error;
query a change log stored at the database restore system to identify one or more data entries in the database that were modified after the restore time, the change log comprising one or more change records corresponding to the one or more data entries, the one or more data entries comprising a subset of total data entries in the database;
determine that a data entry associated with a data entry identifier was added to the database after the restore time based at least in part on the one or more change records not comprising the data entry identifier;
determine respective previous values of the one or more data entries from a previous copy of the database stored at the database restore system, the previous copy being based at least in part on a full backup copy of the database and corresponding to a time period prior to the restore time; and
perform a partial restoration of the database by reverting the one or more data entries to the respective previous values of the one or more data entries, wherein performing the partial restoration of the database comprises removing the data entry from the database.

15. The apparatus of claim 14, wherein the instructions are further executable by the processor to cause the apparatus to:
identify one or more partial changes made to the database after the restore time, wherein the respective previous values of the one or more data entries is determined using the one or more partial changes.

16. The apparatus of claim 14, wherein the instructions are further executable by the processor to cause the apparatus to:
receive, via a user interface, a user input that indicates a time at which the error occurred within the database, wherein the detection of the error is based at least in part on the user input.

17. The apparatus of claim 14, wherein the instructions are further executable by the processor to cause the apparatus to:
receive, via a user interface, a user input that indicates a second data entry affected by the error, wherein the instructions to determine the respective previous values of the one or more data entries are executable by the processor to cause the apparatus to determine a value of the second data entry prior to the error, wherein the previous copy corresponds to a time prior to the error.

18. The apparatus of claim 14, wherein the instructions are further executable by the processor to cause the apparatus to:

retrieve an identifier of a second data entry that was modified after the restore time, wherein the instructions to query the change log are executable by the processor to cause the apparatus to query the one or more change records in reverse chronological order using the identifier of the second data entry.

19. A non-transitory computer-readable medium storing code for database restoration, the code comprising instructions that are executable by a processor to:

detect an error in a database supported by a database restore system;

determine a restore time for the database based at least in part on detection of the error, the restore time occurring prior to the error;

query a change log stored at the database restore system to identify one or more data entries in the database that were modified after the restore time, the change log comprising one or more change records corresponding to the one or more data entries, the one or more data entries comprising a subset of total data entries in the database;

determine that a data entry associated with a data entry identifier was added to the database after the restore time based at least in part on the one or more change records not comprising the data entry identifier;

determine respective previous values of the one or more data entries from a previous copy of the database stored at the database restore system, the previous copy being based at least in part on a full backup copy of the database and corresponding to a time period prior to the restore time; and perform a partial restoration of the database by reverting the one or more data entries to the respective previous values of the one or more data entries, wherein performing the partial restoration of the database comprises removing the data entry from the database.

\* \* \* \* \*